Jan. 12, 1971   G. A. FISHER ET AL   3,553,860
GIMBAL AND UNIVERSAL COUPLING LIFT CYLINDER
MOUNTING FOR SCRAPERS
Original Filed Nov. 24, 1967   2 Sheets-Sheet 1
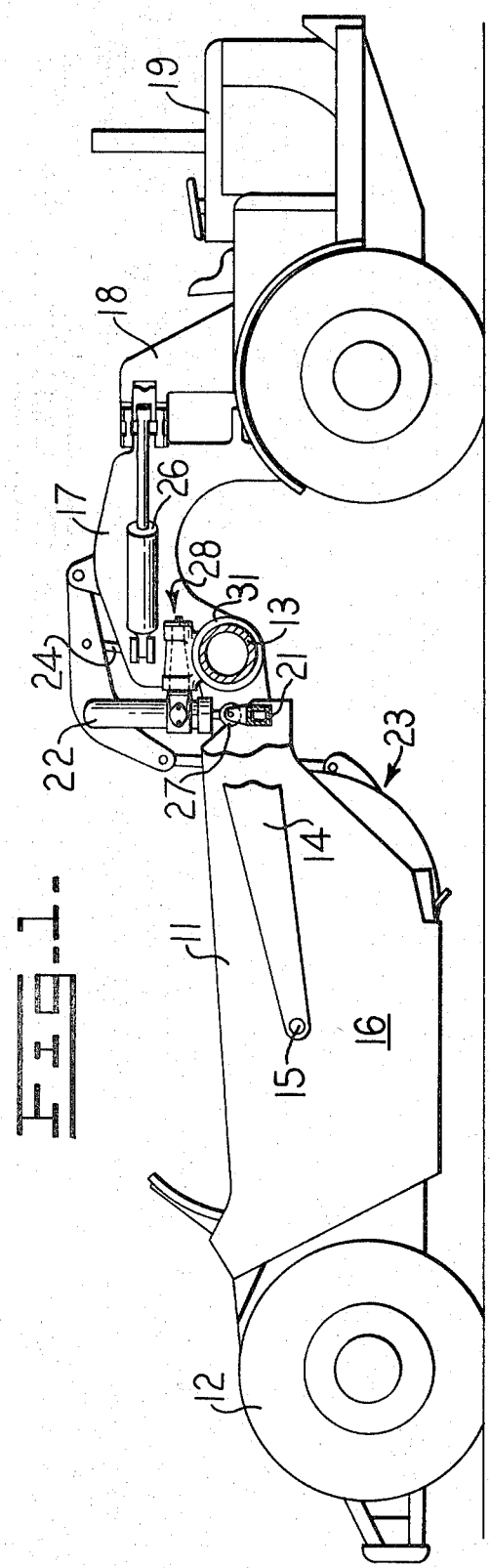
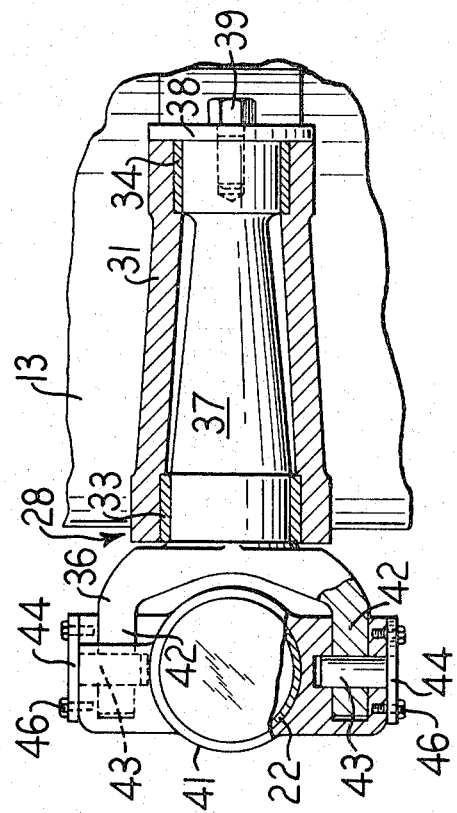
INVENTORS
GEORGE A. FISHER
ROGER M. SMITH
BY
*Fryer, Tjensvold, Feix, Phillips & Lempio*
ATTORNEYS

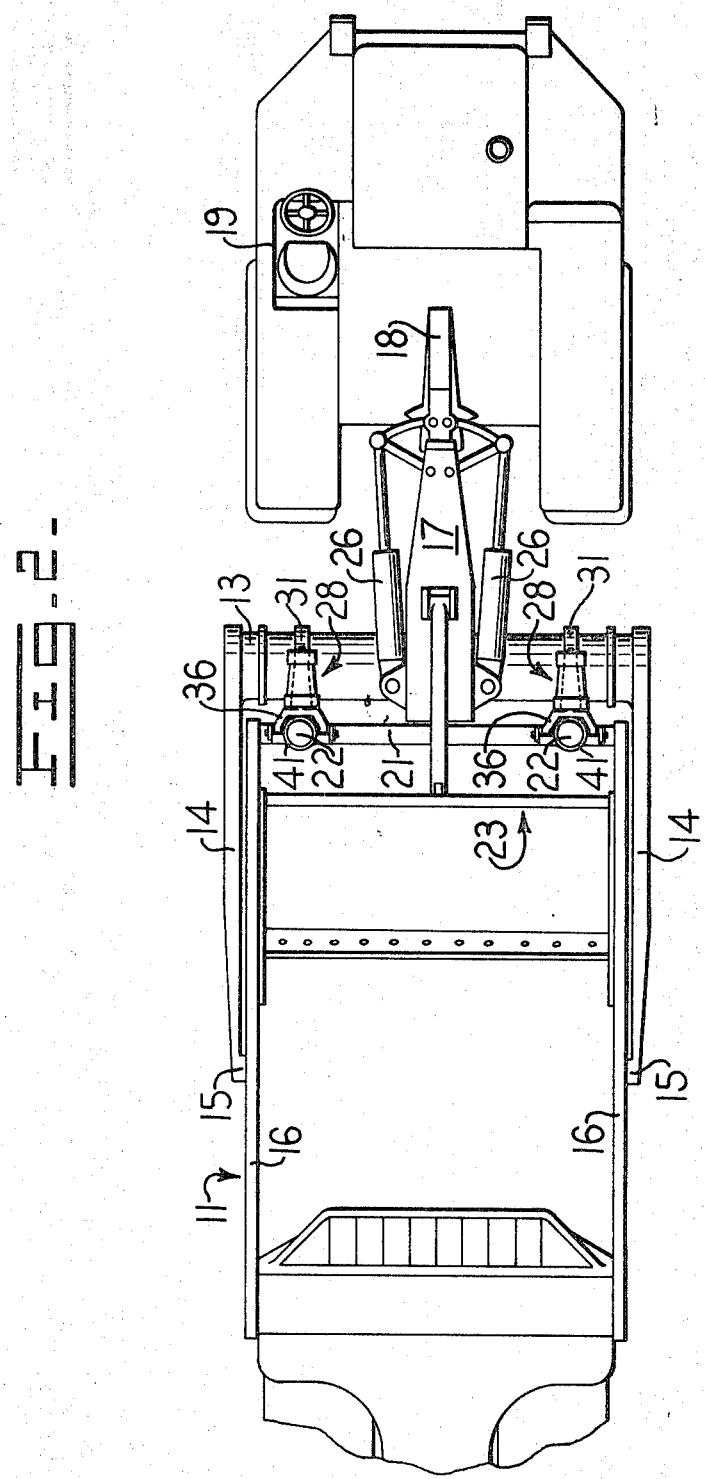

United States Patent Office 3,553,860
Patented Jan. 12, 1971

1

3,553,860
GIMBAL AND UNIVERSAL COUPLING LIFT CYLINDER MOUNTING FOR SCRAPERS
George A. Fisher and Roger M. Smith, Joliet, Ill., assignors to Caterpillar Tractor Co., Peoria, Ill., a corporation of California
Continuation of application Ser. No. 847,801, July 24, 1969, which is a continuation of application Ser. No. 685,508, Nov. 24, 1967, both now abandoned. This application Feb. 2, 1970, Ser. No. 7,398
Int. Cl. E02f 3/62
U.S. Cl. 37—129                                    4 Claims

ABSTRACT OF THE DISCLOSURE

Hydraulic jacks for raising and lowering the bowl of a scraper are pivotally interconnected between the ends of a bowl spreader member and a transverse tube of the draft frame to reduce stresses in those members and the gooseneck member of the scraper hitch. To further reduce these stresses, the jacks are secured to the draft tube by means of a gimbal type connection.

---

This application is a continuation of Ser. No. 847,801 filed July 24, 1969, which was a continuation of Ser. No. 685,508, filed Nov. 24, 1967, both of which are now abandoned.

In a conventional type of earthmoving scraper, its bowl is forwardly supported by a draft frame including a transverse spreader tube and arms extending rearwardly for pivotal connection to sidewalls of the bowl. A gooseneck member is centrally secured to the draft tube and extends forwardly to be connected with and supported by a suitable hitch on a tractor. To support the forward end of the bowl and to raise and lower it during operation of the scraper, one or more hydraulic jacks are interconnected between the gooseneck member and a central point of a spreader member connected between the forward ends of the scraper bowl sidewalls. Tractive power for pulling the scraper causes concentrated stresses in the gooseneck member. Lateral motion of the scraper bowl due to uneven terrain, for example, is resisted by the tractor so that additional stresses are concentrated in the gooseneck member. Thus, mechanical failure due to severe stress levels may result in the gooseneck member. The prior art positioning of the lift jacks is therefore relatively undesirable since they place additional stresses across the gooseneck member which are substantial when the scraper bowl, supported by the lift jacks, is loaded. Additionally, the central connection of the lift jacks to the draft frame requires that the draft frame spreader tube be of heavy construction to resist large bending and torque moments and that the bowl spreader be of heavy construction to resist the large bending moment resulting from the lift jacks acting thereupon.

To reduce stress in the draft frame and bowl spreader of the scraper and to minimize stress in the critical gooseneck member of the scraper hitch, the present invention provides hydraulic jacks, for supporting the bowl as well as raising and lowering it, which are pivotally connected between the spreader member and the draft frame generally at the end of the spreader member. To further reduce stresses transmitted through the lifting motors from oscillating motion of the bowl, the hydraulic motors are preferably secured to the draft frame by means of gimbal type connections.

2

Numerous advantages are provided by the above mounting of the lift jacks. Since the lifting motors or jacks are connected between the ends of the spreader member and the draft frame adjacent its arms which connect to the bowl sidewalls, bending force is reduced on both of those members. Also, the torque in the central portion of the draft frame spreader tube is reduced since the lift cylinder torque subtracts from the torque applied by the load on the draft arm pivot. This permits these members to be reduced in size or else carry a heavier load. Of at least equal importance, stresses are substantially reduced in the gooseneck member since the lift jacks are not directly connected thereto. Additionally, the possibility of decreasing the weight of the spreader member and the draft frame may permit corresponding weight reduction in other portions of the scraper bowl. Decreasing the size of these members also permits some reduction of the scraper wheel base. Further, since two lift jacks are employed in the present scraper, support of the bowl is maintained even though one of the lift jacks should fail.

Additional advantages of the present invention will be made aparent in the following description wherein reference is made to the accompanying drawings.

In the drawings:

FIG. 1 is a side elevation view of a tractor drawn scraper embodying the present invention;

FIG. 2 is a plan view of the scraper of FIG. 1, and

FIG. 3 is a fragmentary view, partially in section of a mounting connecting the lift jacks to the draft frame.

Having reference to both FIGS. 1 and 2, a tractor drawn scraper is illustrated as having a bowl 11 rearwardly supported by a pair of wheels, one of which is shown at 12. To support the forward end of the bowl, a transverse spreader tube 13 has a pair of draft arms 14 which extend rearwardly for pivotal connection, at 15, to the sidewalls 16 of the bowl. The spreader tube 13 of the draft frame is centrally secured to a gooseneck member 17 which extends forwardly to be pivotally supported by a hitch 18 on a tractor 19. The scraper bowl also has a spreader member 21 secured between the forward ends of the bowl sidewalls. To support the forward end of the bowl and to raise and lower the bowl during operation of the scraper, a hydraulic lift cylinder or jack 22 is disposed generally at each side of the scraper and is pivotally connected to an end of the spreader member 21 and to the transverse spreader tube 13 adjacent one of its arms 14.

Although not a part of the present invention, the scraper is illustrated as having an apron 23 which is raised and lowered to open and close the forward end of the bowl by means of a jack partially indicated at 24. Similarly, steering of the tractor drawn scraper is conventionally accomplished by means of steering jacks 26.

To permit operation of the lift jacks 22 with minimum resulting stresses, the rod of each lift jack is connected to one end of the spreader member 21 by means of a universal coupling such as a ball joint connection as at 27 in FIG. 1. The cylinder of each lift jack is connected to the transverse spreader tube 13 generally adjacent one of its arms 14 by means of a gimbal mounting 28. Each of the gimbal mountings 28, as best seen in FIG. 3, comprises a support casting 31, welded or otherwise fixed to the spreader tube 13 adjacent one of its draft arms 14 (see FIGS. 1 and 2). Each of the support castings contains a pair of bushings 33 and 34. A yoke 36 for connecting the hydraulic lift cylinder to the support castings has an end 37 with journals fitting the bushings 33 and 34. The end 37 of the yoke is retained in the bore 32 by means of an end plate 38 and cap screws 39. Arms 42 of the yoke 36 are pivotally secured to a casting 41 by means of pins 43 which are retained in place by end plates 44 and capscrews 46. Thus, the pivotal connection of the yoke 36 with the lift cylinders by means of pins 43 permits pivotal motion therebetween about a horizontal axis normal to the longitudinal axis of the scraper. The trunnion-like connection provided by the yoke end 37 and the casting 31 permits pivotal motion between the draft tube 13 and each lift cylinder about an axis parallel to the longitudinal axis of the scraper. As the scraper bowl is raised and lowered by the lift jacks, the ball joint connection 27 between each of the lift jack rods and the spreader member 21 follows an arc generated by the bowl as it pivots on its rear wheels 12. The freedom of motion provided between the lift cylinders and the draft tube 13 by means of the gimbal mounting 28, together with the ball joint connections 27, greatly reduces stresses.

What is claimed is:

1. A production type scraper, comprising
 a bowl rearwardly supported by wheels, said bowl including a floor and sidewalls, said bowl being open at its forward end,
 a cutting edge disposed along a forward edge of the bowl floor,
 an apron pivotally supported at the forward open end of the bowl, said apron being movable between an open position wherein said apron is above and substantially forward of said cutting edge, and a closed position wherein said apron extends forwardly and upwardly from said cutting edge,
 a transverse spreader member secured between upper portions of the bowl sidewalls at a position forward of said apron in its open and closed positions and substantially forward of said cutting edge,
 a draft frame comprising a transverse draft member disposed forwardly of and adjacent said spreader member, draft arms extending rearwardly from the ends of said draft member to pivotal connections with the respective bowl sidewalls and a hitch extending forwardly from a central portion of the draft member for connection to a tractor,
 a plurality of hydraulic jacks each comprising a vertically disposed cylinder and extensible rod for raising and lowering the bowl relative to the transverse draft member, and
 means for mounting said jacks at the respective ends of said draft member inboard of said draft arms, said means comprising a gimbal support disposed closely adjacent to said draft member and extending rearwardly therefrom for connection with the rod end of said cylinder to support all of said cylinder substantially above the level of said draft member, and universal coupling means connecting said rods to said spreader member, said connections between the gimbal supports and the rod ends and the respective pivotal connection means being disposed closely proximate to each other when said bowl is in the raised position and permitting substantial side play between said bowl and said transverse draft member in order to minimize side loading of said rods relative to said respective cylinders.

2. The invention of claim 1 wherein the mounting means for each of said jacks comprises a mounting member secured to said draft member, said mounting member forming a bore longitudinally arranged relative to the scraper and a yoke rotatably supported in the bore, the yoke forming a pivotal trunnion connection with one of said jacks, the trunnion connection having a transversely arranged pivot axis relative to the scraper, the universal coupling means connecting each jack with said spreader member being a ball joint.

3. A production type scraper, comprising
 a bowl rearwardly supported by wheels, said bowl including a floor and sidewalls, said bowl being open at its forward end,
 a cutting edge disposed along a forward edge of the bowl floor, the bowl sidewalls having a forward edges extending forwardly and upwardly from the cutting edge,
 an apron pivotally supported at the forward open end of the bowl, said apron being movable between an open position wherein said apron is above and substantially forward of said cutting edge, and a closed position wherein said apron extends forwardly and upwardly from said cutting edge, the forward edges of the bowl sidewalls being generally in alignment with said forwardly and upwardly extending apron in its closed position,
 a transverse spreader member secured between upper portions of the bowl sidewalls generally adjacent their forward edges in a position forward of said apron in its open and closed position and substantially forward of said cutting edge,
 a draft frame comprising a transverse draft member disposed forwardly of and adjacent said spreader member, draft arms extending rearwardly from the ends of said draft member to pivotal connection with the respective bowl sidewalls and a hitch extending forwardly from a central portion of the draft member for connection to a tractor, and
 a plurality of hydraulic jacks each comprising a vertically disposed cylinder and extensible rod for raising and lowering the bowl relative to the transverse draft member, means for mounting said jacks generally at respective ends of said draft member inboard of said draft arms, said means comprising a gimbal support disposed closely adjacent to said draft member and extending rearwardly therefrom for connection with the rod end of said cylinder to support all of said cylinder substantially above the level of said draft member, and universal coupling means connecting said rods to said spreader member, said means for mounting said jacks permitting said draft member to be maintained at approximately the same height as said spreader member when the bowl is raised by retraction of said jacks.

4. A production type scraper, comprising
 a bowl rearwardly supported by wheels, said bowl including a floor and sidewalls, said bowl being open at its forward end,
 a cutting edge disposed along a forward edge of the bowl floor,
 an apron pivotally supported at the forward open end of the bowl, said apron being movable between an open position wherein said apron is above and substantially forward of said cutting edge, and a closed position wherein said apron extends forwardly and upwardly from said cutting edge,
 a transverse spreader member secured between upper portions of the bowl sidewalls at a position forward of said apron in its open and closed positions and substantially forward of said cutting edge,
 a draft frame comprising a transverse draft member disposed forwardly of and adjacent said spreader member, draft arms extending rearwardly from the ends of said draft member to pivotal connections with the respective bowl sidewalls and a hitch extending forwardly from a central portion of the draft member for connection to a tractor, and
 a plurality of hydraulic jacks each comprising a vertically disposed cylinder and extensible rod for raising and lowering the bowl relative to the transverse draft member, and
 means for mounting each of said jacks generally at the respective ends of said draft member in respective spaced apart relation with said draft arms, said means for mounting each of said jacks comprising a mounting member secured to said draft member, a yoke rotatably supported on the mounting member by means of a pivot connection having its axis arranged in longitudinal relation with the scraper, the yoke forming a pivotal trunnion connection with the rod end of a respective one of said jacks, the trunnion connection having a transversely arranged pivot axis relative to the scraper, the extensible rod of each jack being pivotally connected with said spreader member by means of a ball joint.

References Cited

UNITED STATES PATENTS

| | | |
|---|---|---|
| 2,406,826 | 9/1946 | French et al. |
| 2,565,850 | 8/1951 | Hyler et al. |
| 2,922,237 | 1/1960 | Harrison et al. |
| 3,028,694 | 4/1962 | Creighton. |
| 3,312,364 | 4/1967 | Granryd. |

EDGAR S. BURR, Primary Examiner